Feb. 15, 1966  R. D. FRANCIS  3,235,388
METHOD FOR PRODUCING FOOD PRODUCT
Filed Feb. 6, 1963  2 Sheets-Sheet 1
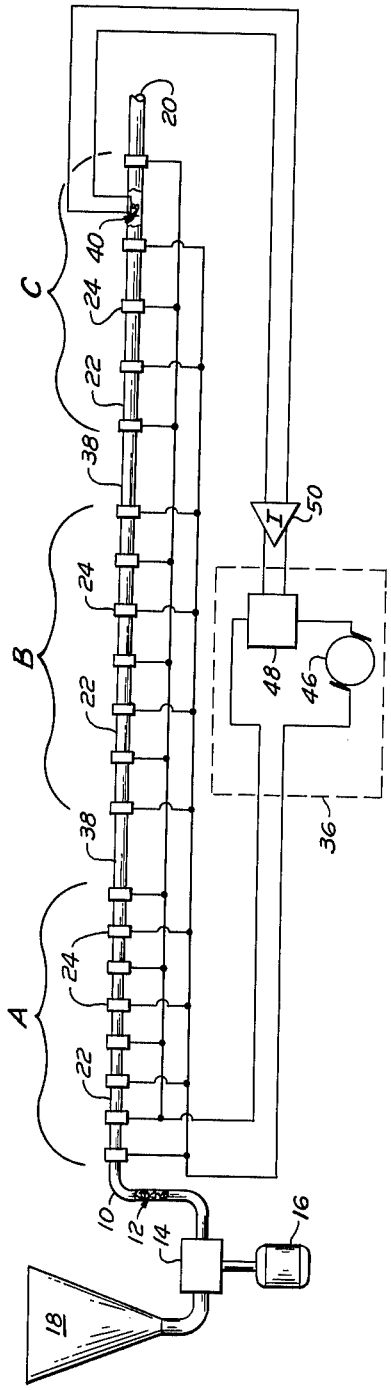
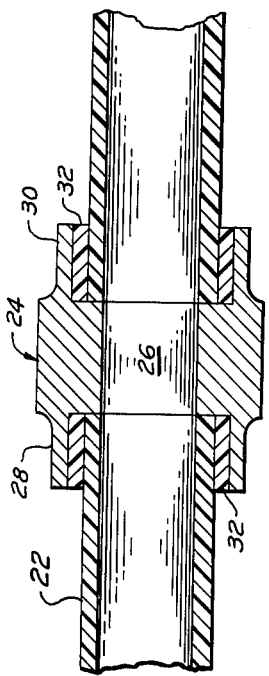
RAY D. FRANCIS
INVENTOR.
BY R.G. Story
ATTORNEY.

RAY D. FRANCIS
INVENTOR.

United States Patent Office 3,235,388
Patented Feb. 15, 1966

3,235,388
METHOD FOR PRODUCING FOOD PRODUCT
Ray D. Francis, Chicago, Ill., assignor to Swift & Company, Chicago, Ill., a corporation of Illinois
Filed Feb. 6, 1963, Ser. No. 256,641
5 Claims. (Cl. 99—109)

This invention relates generally to method and apparatus for producing a formed meat product from raw emulsions. More specifically the present invention is directed to a method for continuously setting up sausage emulsion by heating the emulsion as it is forced through a length of conduit.

Traditionally sausages have been produced by stuffing a substantially fluid emulsion into casings and then heat processing the emulsion within the casings to set it up and cook it. So-called skinless sausages, such as skinless frankfurters, have had casings stripped from the cooked product. Within the last several years a few developments have come forth for producing certain sausage products without the use of casings. One of the most promising and successful new methods has involved electrical heating of sausage emulsion while contained in fixed molds. It has also been recently proposed to heat sausage emulsion flowing through a conduit, preferably by the induction of high frequency electrical energy. The latter method, if practical, has many advantages in continuous production.

However, I have found that the latter method for heating emulsion when flowing through a tube is complicated and difficult due to uneven heat distribution throughout the material. With the use of either radiant or electrical energy the flowing emulsion will be heated to a greater extent adjacent its peripheral surface than at the center of the flowing material. In the case of radiant energy this is obviously due to the fact that such energy is received at the outer surface of the material. The use of electrical energy also involves reception of the energy on the outer surface of the material; and also involves the electrical phenomenon of relatively greater current flow at the surface of a conductor, such as the flowing emulsions, with consequently greater heating at the surface.

A further difficulty is encountered in controlling the amount of heat added to flowing emulsion so as to result in a product uniformly heated to a desired temperature condition. Our experience with the previously proposed methods for heating flowing emulsion has been characterized by poor product resulting from uneven and ofttimes inadequate heating. Attempts to compensate for these deficiencies have often resulted in undesirable overheating of portions of the product.

In addition to the problem of greater heating at the surface of the product, methods involving electrical heating are further complicated by the fact that the electrical resistance characteristics of sausage emulsion change with temperature. We have found that the coefficient of resistance drops radically with an increase in temperature through the usual processing temperature range.

Accordingly it is a primary object of this invention to provide an improved method for heating sausage emulsion while continuously flowing through a conduit.

It is another object of this invention to provide an improved method for substantially evenly and uniformly raising the temperature of flowing sausage emulsion to at least the coagulation point of the emulsion.

It is a further object of this invention to provide an improved method for electrically heating sausage emulsion to its coagulation point while flowing through a conduit.

It is still another object of this invention to provide an improved method to raise the temperature of sausage emulsion flowing through a conduit to above its coagulation point by electrical resistance heating of the emulsion through a plurality of zones of approximately equal resistivity.

Broadly speaking the method of this invention involves the heating of flowing sausage emulsion, within a conduit of less than 2 inches internal diameter, in a plurality of segregated heating zones interspaced by intervals of minimal or zero addition of heat. The latter intervals are referred to as dwell intervals, with reference to temperature rather than flow conditions of the emulsion. Such dwell intervals are located between heating zones to permit development of substantially uniform temperature across the emulsion cross sectional normal to the direction of flow.

Substantially uniform quantities of heat are added to the emulsion at each of a plurality of heating increments within each zone. It is preferred that the heating be accomplished in the plurality of zones by electrical resistance heating employing the emulsion itself as the load in an electrical circuit. To this end approximately equal amounts of electric power are applied to the emulsion across each of the aforementioned heating increments. The application of power to all heating increments is regulated in inverse relation to temperature variation of the emulsion, about a desired level, taken at the last heating increment.

An apparatus devised to carry out this method comprises basically, a conduit divided into a number of heating increments and zones and dwell intervals by a plurality of annular energy introducing means. The length of such increments, generally speaking, increases by zones along the conduit in direction of the flow of the emulsion. The energy introducing means are preferably annular electrodes which are alternately connected to opposite sides of an alternating current power supply which includes a high frequency saturable reactor. A temperature sensing element is exposed to the emulsion flow in the conduit near the last energy introducing means, and is connected to regulate the output of the power supply. An advantage of the preferred power supply is responsiveness to relatively small signals from the sensing element and ability to widely vary the amount of power applied at any given time.

Further objects and advantages of the present invention will become obvious upon reading the following description taken in conjunction with the drawings wherein:

FIGURE 1 is a schematic drawing of the equipment for setting up sausage emulsion according to the present invention;

FIGURE 2 is a partial sectional view of the equipment shown in FIGURE 1;

Figure 3:
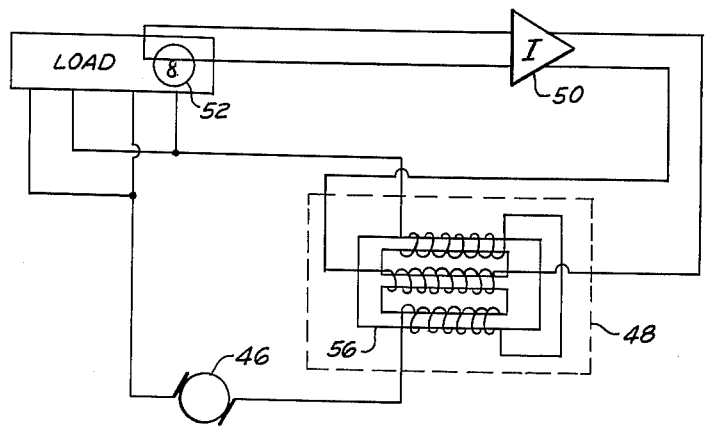
FIGURE 3 is a schematic drawing of a preferred alternating current power supply device.

The present method involves establishing a flow of sausage emulsion, comprising mainly meat material, through a conduit at a given rate. While the invention will be described with reference to sausage emulsion prepared mainly from the meat of warm blooded animals it is to be understood that the invention is also applicable to other food emulsions prepared from fish and poultry flesh, or vegetable materials, or mixtures of the foregoing materials. We have found that satisfactory product can be set up (that is, coagulated) and even cooked within a conduit at a lineal flow rate of approximately three inches per second. The conduit is preferably one inch in internal diameter but may approach about two inches in diameter. Above the latter diameter the product tends to become overheated at the surface if the center of the material is heated to coagulation temperatures. Substantially equal amounts of heat are applied to the emulsion at each of a plurality of increments of the conduit path. Preferably this is accomplished by electrical resistance heating utilizing the resistance of the meat emulsion itself to convert electrical power into heat energy. Accordingly substantially equal amounts of heat are generated in the emulsion within each of the aforementioned increments by applying equal amounts of electrical power therein.

As the emulsion passes through successive increments its temperature will increase due to the added energy. The temperature, however, will not increase at a uniform rate, and increasingly greater quantities of heat energy are required for each degree temperature rise at higher temperature ranges. Additionally, as the temperature of the emulsion does increase the coefficient of electrical resistance, conveniently expressed in ohms per inch length, decreases substantially in accordance with an exponential curve such as that shown in FIGURE 4 for a typical meat emulsion. Thus considering the basic electrical relationships, $e=ir$ (voltage=current×resistance) and $P=ei$ (watts power=voltage×current), it may be seen that to maintain equal electrical power application throughout each of the several increments of flow length it is necessary to either decrease the voltage applied across succeeding increments of flow, or increase the length of succeeding increments to thereby increase the total resistance therein.

It is preferred to apply uniform voltage across succeeding increments of increasing length selected to maintain the resistance of emulsion therein at substantially a constant level with respect to all increments. Accordingly, the power supply may be connected to impress equal voltages across each increment of conduit. As a practical convenience average resistance data for emulsion through a given temperature range has been determined, as represented by the sloped broken lines in FIGURE 4, and the length of several adjoining increments making up a continuous heating zone is based thereon. As illustrated the zones A, B and C are selected so the average lines do not depart substantially from the actual curve. Accordingly, in practice several adjacent increments will be of equal length and the resistance of emulsion flowing therein will not be exactly uniform. However, the actual difference in resistance is kept small and the benefit in ease of equipment fabrication justifies the slight deviation from absolutely uniform heat application in all heating increments.

With resistance heating, the meat emulsion acts similar to other conductive material in that the current tends to flow at the outer surface of the conductor. Accordingly, greater heating and temperature rise occur near the surface of emulsion flowing through the conduit. Similar heat distribution is obtained using radiant energy. However, if this is not controlled, overheating of the surface will occur. Therefore, to provide inward distribution of heat, negligible or zero amounts of heat are applied at intervals along the path of emulsion. These intervals allow a period of about four to five seconds for equalization of temperature throughout the emulsion in a one-inch diameter cross section. Longer periods may be required for larger flow bodies of emulsion. The dwell intervals are conveniently located at areas in the emulsion flow wherein the surface temperature of the emulsion is approximately at points where the average lines on the above mentioned resistance curve intersect.

Figure 4:
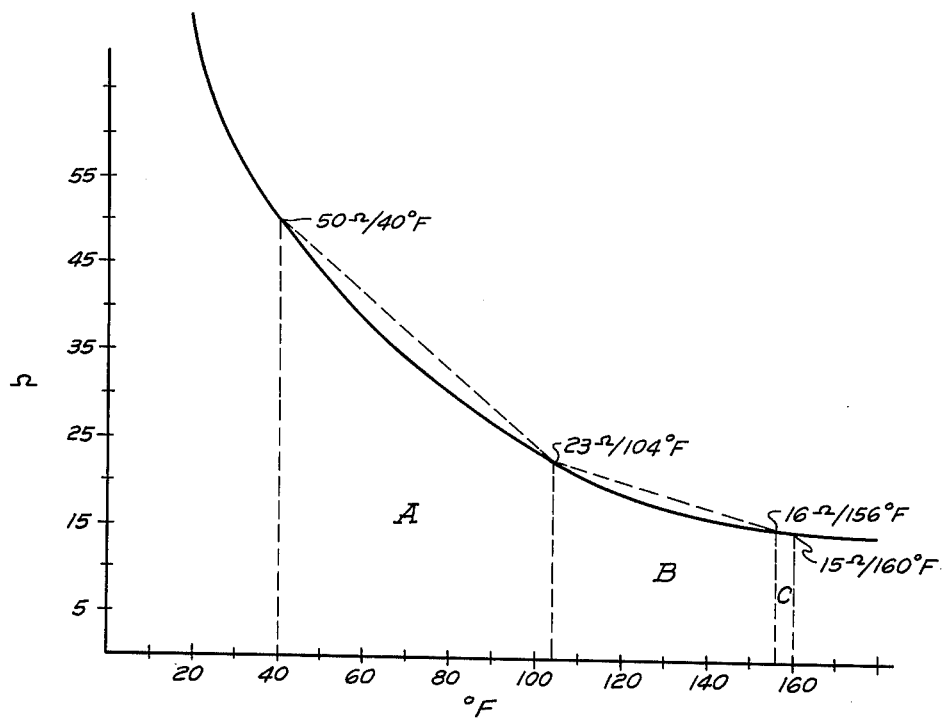
FIGURE 4 is a representative graph of ohms per inch resistance plotted against increasing temperature for a typical sausage product emulsion.

Also in selecting the locations for dwell intervals the nature of the end product should be kept in mind. That is, where a completely cooked product is desired, it is necessary to bring the final temperature to about 160° F. However, where it is merely necessary to bring the emulsion to its coagulation point so that it will set up and may be further processed in ovens or the like, an end temperature of about 120° to 130° F. is sufficient. One of the dwell intervals is utilized before the emulsion reaches the threshold of coagulation (120° F.), preferably when the surface temperature of the emulsion reaches about 104° F. Additionally, where the product is to be fully cooked within the conduit, it is preferred that a second dwell interval be employed when the surface temperature approaches approximately 156° F. The selection of these dwell temperature levels and the heating zones shown in FIGURE 4 are interdependent. At a flow rate of about three inches per second the dwell interval of conduit need only be about one foot long.

To control the end product temperature the temperature of the emulsion is constantly measured at a point within the last heating increment of emulsion flow. This information is compared with the desired end temperature, and the power applied at each of the heating increments is adjusted accordingly in inverse relation to the difference between measured and desired temperatures. However, the change in power is preferably a very steep slope linear function of the difference between measured and desired temperatures. Where the differential in temperature is small, e.g., from a fraction of a degree up to about three degrees, the increase or decrease in power may be very small. However, when the temperature differential is relatively large, e.g., five to ten degrees or greater, the power change should be much greater. For instance, where the measured temperature is substantially higher than the desired temperature, power may be momentarily decreased substantially to zero. Similarly, should the measured temperature be substantially below the desired temperature, the power may be doubled for a brief period. According to the preferred method this may be accomplished by regulation of the voltage applied across the respective increments of emulsion flow.

Preferably the present method involves the application of high frequency alternating current at about 10,000 cycles per second. This has two distinct advantages. First, the high frequency current minimizes electrolysis of the annular electrodes utilized for resistance heating. Second, the high frequency power supply that has proved most advantageous, operating at up to 220 volts, may be very accurately regulated.

Additionally I have found that an important operating characteristic for this method is the electric current density developed at any increment of flow. Current density may be conveniently calculated on the area of electrode surface. In this regard it has been found that the current density should be no greater than about 2.25 amps per square inch of electrode surface, with an optimum figure of 1.27 amps per square inch. Above 2.25 amps per square inch heating occurs too rapidly at the surface of the emulsion material, with consequent separation of emulsion elements and flashing of moisture. Although lower current densities, when continuously applied, are not critical to the product, slow heating will result and practical limitations such as length of equipment will govern the process. These current density figures are also predicted on a maximum electrode width of ¾ inch for a 1-inch inside diameter conduit. Electrodes 1-inch wide have also been successful. Larger electrode diameters will permit the above stated current density to be exceeded.

The maximum permissible current density will also influence the minimum permissible length of a heating increment between successive electrodes. Again recalling the basic electrical relationship, $i=e/r$, it may be seen, where voltage is constant, that current and current density for a given electrode will increase as resistance decreases. Thus, since resistance depends upon the length of emulsion between electrodes, it may be seen that for a given voltage range a minimum increment length will be established by the maximum permissible current density figure.

A preferred system for practicing the described method employs three sizes of heating increments ranging from four to eight inches long.

An apparatus devised for carrying out the foregoing invention is illustrated in FIGURES 1 through 3. The apparatus comprises a conduit 10 connected at one end to a source of emulsion under pressure generally 12, such as a positive displacement pump 14 coupled to an electric motor 16 and fed with emulsion ingredients from a hopper 18. A conventional sausage stuffer apparatus (not shown) could also be utilized as the source of emulsion. The opposite discharge end of the conduit 20 may discharge the heated product into any convenient handling apparatus (not shown) such as a severing means, conveyor, filling apparatus, or further processing equipment such as smoke and cooking ovens.

The conduit 10 is constructed of a nonconductive material, preferably a polymerized tetrafluoro ethylene plactic such as that sold under the name "Teflon." The conduit generally 10 is composed of a plurality of sections or increments 22 which are joined by a plurality of annular electrode couplings generally 24. Each coupling is made of a conductive metal, preferably stainless steel, and has a relatively thick center shoulder 26 and a pair of short, oppositely extending sleeves 28, 30, as seen in FIGURE 2. Each sleeve 28, 30 contains a nonconductive plastic insert 32, preferably a plasticized polyvinyl chloride material such as that sold under the name "Tygon," within which the conduit increments 22 are press fitted. An internal ridge is located within the shoulder portion 26 of the electrode coupling 24 defining a circular opening therethrough of a diameter equal to the inside diameter of the conduit 10 (one inch in the described embodiment). Thus a smooth internal channel of uniform dimension is provided in the conduit 10 and the electrode couplings 24.

Alternate electrode couplings 24 along the length of conduit 10 are electrically connected by wires to opposite sides of a power supply generally 36, to be subsequently explained.

In the illustrated embodiment a total of twenty electrode couplings 24 are utilized. Preferably the couplings are divided into a series of three zones, A, B and C. In each zone the length of the increments of conduit 22 are usually equal and the length of increments in succeeding zones are usually longer than in the preceding zones. Each zone is separated by a longer section of conduit between the last electrode coupling of one zone and the first coupling of the next zone. The latter sections are termed dwell sections 38. The final increment of conduit between the last two electrode couplings 24 in Zone C is also of a greater length, and preferably equal to the dwell sections 38. A temperature responsive element generally 40 is positioned within the last increment. The specific embodiment illustrated is designed to heat emulsion through coagulation and to a final cooking temperature of 160° F. The dwell points were established at 104° F. and 156° F. Usually sausage emulsion is chilled during preparation, and is available at about 40° F. It was found that seven heating increments of conduit 22 spaced between eight electrode couplings 24 were necessary to raise the temperature of the emulsion from 40° F. to about 104° F. Similarly six heating increments of conduit between seven electrode couplings were required in Zone B to heat the material from about 104° F. to about 156° F.; and three heating increments between four electrode couplings and a final elongated increment were required in the last Zone C to heat emulsion from 156° F. to about 160° F. The increments 22 are four inches long in Zone A, six inches in Zone B, and eight inches in Zone C, as measured between centers of the electrode couplings 24. The dwell sections 38 and the final increment in Zone C measure twelve inches between centers of the electrode couplings.

Emulsion begins to set up on a time-temperature basis above about 120° F. That is, it will coagulate in a number of seconds if held at 120° F.; and at higher temperatures the time interval required to coagulate is decreased. Accordingly, it is thought that at the higher temperatures the change of state in the meat emulsion involves a substantially endothermic reaction with little temperature change realized from the addition of heat, whereas at lower temperature the addition of heat produces a noticeable rise in temperature.

It will be noted in FIGURE 1 that some electrical power and, therefore, some heat, will be introduced in the dwell sections 38 since the electrode couplings at either end thereof are connected to oposite sides of the power supply. However, due to the relatively long distance between those electrode couplings, as compared to the heating increments in Zones A, B and C, the resistance of the emulsion therein is much greater and therefore the amount of heat added may be regarded as negligible while the distribution of existing heat takes place.

The preferred power supply is a new application of a saturable reactor. Generally speaking, the present preferred power supply comprises a 10,000 c.p.s. generator 46 coupled electrically in series across the load and a 10,000 c.p.s. saturable reaction 48, with a universal proportional amplifier 50 connected to impress a variable direct current on the center coil winding of the reactor. The amplifier 50 is a well known instrument comprising a circuit such as that shown and described in "Industrial Electronics Handbook," Cockrell, 1st edition, McGraw-Hill Book Company, at pages 433–434 (including figure 4B–26 therein). The inversely proportional amplifier 50 is in turn actuated by a small signal from the temperature responsive element generally 40, which is preferably a thermocouple 52 (FIGURE 3). Alternate electrode couplings 24 are connected to one side of the generator 46 (odd couplings) and to the output of the saturable reactor (even couplings).

Generally speaking, a saturable reactor is a variable series impedance wherein the impedance varies with the saturation of the core. In turn, the degree of saturation of the core is governed by the amount of current through a D.C. winding on the core of the reactor. Referring to the details of the preferred power supply shown schematically in FIGURE 3, it may be seen that we can speak of a reactor as composed of a three-legged core 56. The center core has a separate winding which in this case is connected across the proportional amplifier 50. The inversely proportional amplifier in turn develops a direct current in the center core winding to saturate to some degree the entire reactor core 56. The two outer legs of the core 56 contain series wound windings with one lead connected to one side of the generator 46 and the other lead, from the winding on the opposite leg, connected to one side of the load (namely, alternate electrode couplings 24). In operation an increased direct current (brought about by a lower temperature) on the center leg winding will cause increased saturation of the reactor core and thereby decrease the voltage drop across the reactor 48. In turn this increases the voltage available at the load, namely, the electrode couplings 24. Further, the inversely proportional amplifier 50 in the preferred system has a high gain and increases the direct current in the center winding as a steep negative linear function of the signal received from the thermocouple 52. Thus for small changes in product temperature from a desired value at the thermocouple 52, little or no change in the direct current from the amplifier 48 is produced. However, as the variation of the signal from thermocouple 52 from an established level becomes of greater magnitude, the D.C. current produced by the amplifier changes at an even greater rate to thereby widely vary the voltage on the electrode couplings 24 in response to variations of the product temperature about a desired end point. Thus the apparatus quickly compensates for any variation from the desired product temperature.

It should be pointed out that prior to this invention saturable reactors operating at frequencies of 10,000 c.p.s. were extremely rare and their applications very limited if not unknown. Generally speaking, reactors of this type involve heat losses related to the operating frequencies. Heretofore it has been thought that the heat loss involved in a reactor operating at 10,000 c.p.s. would be prohibitive if not destructive. However, reactor technology has apparently overcome this problem in that a suitable 10,000 c.p.s. saturable reactor is available commercially through the Barber-Coleman Company of Rockford, Illinois, Catalog No. Johnson 3056. No other supplier of a suitable reactor is known at this time, and the exact construction details of this reactor are not known and do not constitute a part of this invention.

The following example will serve to illustrate the present invention.

EXAMPLE I

An apparatus conforming to the preceding specification and as shown in the drawings was assembled. Pertinent dimensions were as follows:

Inside diameter _____ inch __ 1
Number of electrodes _____ 20
Area of electrode surface _____ sq. in __ 2.3562
Length of conduit heating increments (to center of electrodes):

| | Inches |
|---|---|
| Zone A (first 8 electrodes) | 4 |
| Zone B (electrodes #9–15) | 6 |
| Zone C (electrodes #16–19) | 8 |
| Last increment (electrodes #19–20) | 12 |

Length of dwell intervals:

| | Inches |
|---|---|
| Electrodes #8–9 | 12 |
| Electrodes #15–16 | 12 |

Power supply:
  Saturable reactor—No. Johnson 3056 (Barber-Coleman) 10,000 c.p.s. rated 250 v., 3.3 kw.
  Generator—Ohio Crankshaft Co.—Tocco Motor Generator set. 15 wk. 9,756 c.p.s. (10,000 nominal frequency).

A meat emulsion was prepared from the following ingredients (basis per 100 lbs. meat):

| | |
|---|---|
| Beef (15% fat) _____ lbs __ | 4 |
| Pork trimmings (regular 55% fat) _____ lbs __ | 29 |
| Pork trimmings (lean—20% fat) _____ lbs __ | 67 |
| Salt _____ lbs __ | 3 |
| Sugar (sucrose) _____ lbs __ | 2 |
| Water _____ lbs __ | 3.25 |
| Sodium nitrite _____ oz __ | 1/8 |

Two runs of the emulsion were processed in the apparatus at a rate of approximately 258 lbs. per hour producing a linear rate of flow in the conduit about 2.9 inches per second. The power supply generator was set to deliver 220 v. maximum. The following data was observed and calculated (as indicated below):

*Run 1*

| | Observed data | | | Calculated data | | |
|---|---|---|---|---|---|---|
| Electrode No. (from power supply) | Volts | Supply line current (amp.) | Temp. (° F.) | Current across section (amp.) | Resistance across section (ohm) | Current density (amp./in.²) |
| 1 | 187 | 25.8 | [1] 45 | 1.5 | 124.66 | 0.68 |
| 2 | | 26.0 | | 1.6 | 116.87 | 1.36 |
| 3 | | 24.4 | | 1.7 | 110.00 | 1.40 |
| 4 | | 22.8 | | 1.5 | 124.66 | 1.36 |
| 5 | | 21.1 | | 1.5 | 124.66 | 1.27 |
| 6 | | 19.6 | | 1.7 | 110.00 | 1.36 |
| 7 | | 18.1 | | 1.6 | 116.87 | 1.40 |
| 8 | | 16.4 | 105 | 0.2 | 935.00 | 0.76 |
| 9 | | 14.8 | | 1.7 | 110.00 | 0.81 |
| 10 | | 14.6 | | 1.1 | 170.00 | 1.19 |
| 11 | | 12.9 | | 1.9 | 98.42 | 1.27 |
| 12 | | 11.8 | | 1.6 | 116.87 | 1.48 |
| 13 | | 9.9 | | 1.5 | 124.66 | 1.32 |
| 14 | | 8.3 | | 1.6 | 116.87 | 1.32 |
| 15 | | 6.8 | 152 | 0.5 | 374.00 | 0.89 |
| 16 | | 5.2 | | 1.1 | 170.00 | 0.68 |
| 17 | | 4.7 | | 1.2 | 155.83 | 0.98 |
| 18 | | 3.6 | | 1.3 | 143.84 | 1.06 |
| 19 | | 2.4 | 160 | 1.1 | 170.00 | 1.02 |
| 20 | | 1.1 | [2] 161 | | | 0.47 |

[1] Input.  [2] Output.

*Run 2*

| | Observed data | | | Calculated data | | |
|---|---|---|---|---|---|---|
| Electrode No. (from power supply) | Volts | Supply line current (amp.) | Temp. (° F.) | Current across section (amp.) | Resistance across section (ohm) | Current density (amp./in.²) |
| 1 | 187 | 26.0 | [1] 45 | 1.6 | 116.87 | 0.68 |
| 2 | | 26.0 | | 1.5 | 124.66 | 1.32 |
| 3 | | 24.4 | | 1.5 | 124.66 | 1.27 |
| 4 | | 22.9 | | 1.5 | 124.66 | 1.27 |
| 5 | | 21.4 | | 1.5 | 124.66 | 1.27 |
| 6 | | 19.9 | | 1.8 | 103.88 | 1.40 |
| 7 | | 18.4 | | 1.6 | 116.87 | 1.44 |
| 8 | | 16.6 | 105 | 0.5 | 374.00 | 0.89 |
| 9 | | 15.0 | | 1.1 | 170.00 | 0.68 |
| 10 | | 14.5 | | 1.2 | 155.83 | 0.98 |
| 11 | | 13.4 | | 1.9 | 98.42 | 1.32 |
| 12 | | 12.2 | | 1.6 | 116.87 | 1.48 |
| 13 | | 10.3 | | 1.5 | 124.66 | 1.32 |
| 14 | | 8.7 | | 1.6 | 116.87 | 1.32 |
| 15 | | 7.2 | 152 | 0.5 | 374.00 | 0.89 |
| 16 | | 5.6 | | 1.5 | 124.66 | 0.85 |
| 17 | | 5.1 | | 1.4 | 133.57 | 1.23 |
| 18 | | 3.6 | | 1.2 | 155.83 | 1.10 |
| 19 | | 2.2 | | 1.0 | 187.00 | 0.93 |
| 20 | | 1.0 | [2] 161 | | | 0.42 |

[1] Input.  [2] Output.

The product obtained from the two runs was extruded from the end of the conduit in a form resembling a smooth rope. The surface of the product of each run was hard and rubbery and favorably compared to the surface normally desired on sausage form product. Good resistance to fracture was observed. Finally, the product was considered to be equivalent to sausage product produced by produced by conventional methods, edible, and acceptable for consumer use.

To obtain the foregoing data voltage was continuously read at the output of the saturable reactor and the temperatures continuously recorded at points at the downstream side of the electrodes indicated and the information averaged. Current however could not be continuously recorded throughout the run at each of the reading stations. Instead periodic readings were taken at points along the supply line leading from the reactor to the electrodes. These points were located between each two electrodes and between the first electrode and the reactor. During operation the voltage actually varied briefly between values as high as about 220 v. and as low as about 6 v. Consequently the current readings in certain instances are not truly representative of average conditions. Also, while the emulsion was substantially homogeneous, the actual resistance across any given portion of it flowing into the apparatus, all other conditions remaining constant, could not be expected to conform exactly to a specific value. Therefore it is believed that the periodic observations of current at the various points were also moderately affected by slight variations in the composition of the emulsion flowing between electrodes.

The observed and calculated data taken in both runs, and particularly when considered with additional data from other tests, however, does substantiate that:

(1) Reasonably equal quantities of power were added to the emulsion at each of the heating increments;

(2) Current density at the electrodes and within the emulsion was kept substantially uniform and within acceptable limits; and (3) Temperature rise in the emulsion was controlled and consistently increased from input to output of the emulsion.

EXAMPLE II

A bologna emulsion was prepared from the following ingredients (basis per 100 lbs. meat):

| | |
|---|---|
| Pork trimmings (regular—55% fat) | 57 lbs. |
| Pork cheek and head meat | 10 lbs. |
| Beef—cow meat or chunks | 13 lbs. |
| Beef cheek and head meat | 10 lbs. |
| Beef plates and flanks | 10 lbs. |
| Salt | 3½ lbs. |
| Dextrose | 1½ lbs. |
| Flavoring | 2 oz. |
| Garlic | ½ oz. |
| Cure | 4 oz. |
| Ascorbic acid | ¾ oz. |
| Dry corn syrup solids | 2 lbs. 11 oz. |
| Water (ice) | 25 lbs. |

The emulsion was fed into the apparatus of Example I at a rate of approximately 258 lbs. per hour producing a linear rate of flow of about 2.9 inches per second. The power supply generator was set to deliver 250 v. maximum. The following conditions were observed:

Generator set at 250 v. maximum
Average steady state voltage 200 v.
Average steady state current 25 amp. (power output)
Temperatures:

| | °F. |
|---|---|
| Just after electrode No. 1 (input) | 65 |
| Just after electrode No. 5 | 92 |
| Just after electrode No. 9 | 130 |
| Just after electrode No. 16 | 150 |
| Just after electrode No. 20 (output) | 160 |

The product from this test was extruded in the form of a continuous, smooth rope. It displayed a firm surface, and a few minutes of additional oven heating developed a red cured meat color. The product had a firm, chewy texture comparing favorably to that of conventional product prepared from the same formula. This product was also considered to be equivalent to bologna product by conventional methods.

EXAMPLE III

The previously described apparatus was modified to heat product to coagulation temperature of about 130° F. at the surface leaving the center of the product substantially uncoagulated. This was accomplished using seven heating increments of 4 inch length (unchanged Zone A), a dwell section of 12 inch length and six heating increments of 6 inch (modified Zone B). No further heating was utilized. The power supply was the same as in Example I however maximum voltage and current were held to approximately 165 v. and 15 amp., respectively. An emulsion of the formula given in Example I was pumped at approximately 258 lbs./hr. (flow rate of 2.9 inches/sec.) entering the apparatus at 30° F. Measured surface temperatures averaged 90° F. at the dwell section and 130° F. at outlet. The product was sufficiently cohesive for finish processing in conventional ovens and smoking equipment.

EXAMPLE IV

The same formula as in the preceding example may be heated to coagulation throughout the product, but not to completion or fully cooked temperature by further modification of the apparatus and lowered power input. The conduit was assembled to provide the following heating increments and dwell sections (from entrance to discharge): Zone A—($A^1$) four heating increments 4 inches long, one dwell and temperature measuring increment 6 inches long, and ($A^2$) three additional heating increments 4 inches long; Zone B—six heating increments 6 inches long; and Zone C—three heating increments 8 inches long followed by a 4 foot unheated outlet conduit.

The dwell sections between heating zones AB and BC were 12 inches long. The same power supply was used delivering an average 165 volts and 17.3 amps. Emulsion at 40° F. was pumped at 258 lbs./hr. (2.9 inch/sec.) and surface temperatures of 85° F. and 106° F. were achieved at the dwell sections, respectively. Discharged product showed a substantially uniform temperature of 128° F.

EXAMPLE V

The same formula as in Example I may be processed to completion at a faster rate in larger equipment. 873 lbs./hr. of emulsion at approximately 2.9 in./sec. was pumped through a 1½ inch diameter system comprising the following: Zone A—sixteen heating increments 6 inches long; Zone B—fourteen heating increments 9 inches long; and Zone C—seven heating increments 12 inches long. Dwell sections between heating zones AB and BC were 18 inches long. Electrodes were 1½ inch diameter and ½ inch long. The same power supply was employed to deliver 187 volts at 88 amp. average conditions. Emulsion delivered at 30° F. reached surface temperatures of 100° F. and 150° F. respectively at the two dwell sections, and discharged at 160° F.

Obviously many modifications and variations of the invention as hereinbefore set forth may be made without departing from the spirit and scope thereof, and therefore only such limitations should be imposed as are indicated in the appended claims.

I claim:

1. An improved method for heat treating food material emulsion to form a continuous product of self-sustaining consistency, said method comprising: flowing the emulsion through a passageway in a given direction; resistance heating said flowing emulsion by applying electric power to said emulsion throughout each of a plurality of increments arranged in spaced zones within said passageway so as to increase the temperature of said emulsion while passing through said zones; interspacing said zones of heat application with intervals of minimal heat application to said emulsion to allow the temperature across a section of said emulsion to become uniform; and regulating the amount of power applied to said emulsion in said zones to bring the temperature of said emulsion to a coagulating level at the last of said zones in said direction.

2. An improved method for heat treating food material emulsion to form a continuous product of self-sustaining consistency, said method comprising: flowing the emulsion through a passageway of uniform cross-section in a given direction; peripherally applying electric power to said emulsion across each of a plurality of increments in said direction along a first zone of said passageway to heat said emulsion; applying electric power to said emulsion across a plurality of further increments in said direction along additional zones of said passageway; interspacing the application of electric power between said zones with intervals of minimum electric power providing minimum addition of heat to allow the temperature of emulsion to equalize at said intervals, each of said zones in said direction being spaced from the preceding zone by an interval of greater length than said preceding increments; measuring the temperature of said emulsion at the last increment in the direction of flow; and regulating the power applied at said plurality of increments along said zones in accordance with said measurement of temperature so as to maintain a selected coagulating temperature in said flowing food product at said last increment.

3. An improved method for heat treating meat emulsion to form a continuous product of self-sustaining consistency, said method comprising: flowing the emulsion through a passageway of uniform cross-section in a given direction; peripherally applying electric power to said emulsion across each of a plurality of uniform increments in said direction along a first zone of said passageway; applying electric power to said emulsion across a plurality of further uniform increments in said direction along additional zones of said passageway, the length of said uniform increments in one zone being greater than the length of said uniform increments in any preceding zone; interspacing the application of electric power between said zones with intervals of minimum electric power providing minimum addition of heat to allow the temperature of emulsion to equalize at said intervals, each of said zones in said direction being spaced from the preceding zone by an interval of greater length than the longest of said preceding increments; measuring the temperature of said emulsion at the last increment in said direction of flow; and regulating the voltage applied across said plurality of increments throughout all of said zones with respect to said measurement of temperature so as to maintain a selected coagulating temperature in said flowing food product at said last increment.

4. The method of claim 2 wherein the amount of electric power applied across each of said increments is substantially equal to the amount of power applied across any other increment.

5. The method of claim 3 wherein the voltage applied at said plurality of said increments is uniform at any given time across all of said increments.

References Cited by the Examiner
UNITED STATES PATENTS

| | | | |
|---|---|---|---|
| 2,623,451 | 12/1952 | Prohaska | 99—352 |
| 2,685,518 | 8/1954 | Prohaska | 99—109 |
| 2,860,991 | 11/1958 | Christianson et al. | 99—109 |
| 2,877,118 | 3/1959 | Hensgen et al. | 99—109 |
| 2,953,461 | 9/1960 | Prohaska | 99—109 |
| 3,053,667 | 9/1962 | Luijerink | 99—109 X |
| 3,132,950 | 5/1964 | Macy et al. | 99—109 |
| 3,149,980 | 9/1964 | Gretler et al. | 99—109 |

A. LOUIS MONACELL, *Primary Examiner.*

HYMAN LORD, *Examiner.*